Dec. 26, 1967    C. VAN LOO ETAL    3,360,035
VAPOR COOLING SYSTEM HAVING MEANS RENDERING
A FLOW OF LIQUID THEREIN ELECTRICALLY
NONCONDUCTIVE
Filed May 3, 1967

INVENTORS
COENRAAD VAN LOO
JAMES P. POLESE

BY *Robert W. Dilts*

ATTORNEY

United States Patent Office 3,360,035
Patented Dec. 26, 1967

3,360,035
VAPOR COOLING SYSTEM HAVING MEANS RENDERING A FLOW OF LIQUID THEREIN ELECTRICALLY NONCONDUCTIVE
Coenraad Van Loo, San Jose, and James P. Polese, Menlo Park, Calif., assignors to Varian Associates, Palo Alto, Calif., a corporation of California
Filed May 3, 1967, Ser. No. 635,866
12 Claims. (Cl. 165—105)

ABSTRACT OF THE DISCLOSURE

Means in a vapor cooling system for interrupting the flow of a liquid therethrough to render such flow electrically nonconductive. A disk or other obstruction is housed within a conduit in the system. A number of spikes are attached to the underside of the disk between a series of apertures therein.

Background of the invention

This invention relates generally to vapor cooling systems, and particularly to a component part thereof which provides improved means for preventing liquids circulating within the system from conducting electrical energy.

Vapor cooling systems typically contain a boiler, a condenser or heat exchanger, a vapor exhaust conduit connecting the upper portion of the boiler with the condenser, a return conduit from the condenser to the lower part of the boiler, a water level control box, and an auxiliary reservoir. The boiler, control box and auxiliary reservoir are partially filled with a liquid having a high latent heat of vaporization such as water. An object to be cooled, such as an anode of an electron tube, is immersed in the boiler. Upon subsequent heating of the object, water adjacent thereto is vaporized. The vapor exits from the boiler and ascends through the vapor exhaust conduit to the condenser where heat is removed causing the vapor to condense back to water. The water is then gravity-fed back to the boiler through the return conduit thereby completing the cycle.

The surface of the object to be cooled usually possesses an electrical potential. Such, for example, is the case where the object is an electron tube having an external anode. The boiler in which the object is housed assumes the electrical potential of the object since both abut one another at their common seal. Rubber O-rings have been so arranged at the seal to electrically insulate the boiler from the housed object, but this has generally proved neither satisfactory nor of significant benefit.

Where the condenser is water cooled rather than air cooled it contains a primary cooling system through which vapor from the boiler passes and is condensed to water. Adjacent the primary cooling system is a secondary cooling system through which tap water is normally drawn directly from a municipal source. The secondary cooling system is necessarily electrically grounded: although sections of such system could be made of a dielectric material, the tap water passing therethrough would nevertheless remain electrically conductive. Barring the use of a very large and inefficient condenser having electrical insulators interdisposed between the primary and secondary cooling system, which insulation would correspondingly but adversely act as heat insulators, the two systems are electrically grounded.

Within some vapor cooling systems we thus have one component, the boiler which acquires an electrical potential during system operation and another component, namely the condenser, which remains at ground potential. Obviously, these two components must be electrically insulated in some manner.

Heretofore a section of both the vapor exhaust conduit and of the return conduit has been made of a dielectric material such as plastic. As only dielectric water vapor passes completely through the vapor exhaust conduit to the condenser, this communication between boiler and condenser cannot serve as an electrical conductor. However, this is not true of the water return conduit since though the conduit itself cannot act as a conductor, the liquid housed therein may. Accordingly, the liquid with which vapor cooling systems of the prior art have been filled, has been distilled water. By use of this structure and cooling agent the boiler and condenser have been electrically insulated from one another thereby preventing the object being cooled from shorting out to ground via its own cooling system.

The use of distilled water for insulation purposes has several attendant disadvantages. The system must first of all be filled with distilled rather than ordinary tap water. As water is slowly lost from the system through exciting vapor, it must be replenished from time to time by more distilled water. With the passage of time, the distilled water will also become contaminated by the pipes, leaks in the condenser and by ionization and dirt. Also, since much of the structure is subjected to high temperatures, oxidization of the interior surfaces occurs rapidly. These oxides further contaminate the water. As the degree of contamination increases the electrical conductivity of the water will increase correspondingly. Electrical leakage will become significant and eventually intolerable. This leakage must consequently be monitored in order to know when the contaminated water should be evacuated and replaced with a fresh supply of distilled water. Obviously a vapor cooling system which would not require the use of distilled water nor concern with coolant contamination and the resulting electrical conductivity thereof would be a significant improvement in the art. Furthermore, with the trend in design of vapor cooling systems being towards compactness, electrical leakage between components through the coolant will increase as the resistive path therebetween decreases.

Accordingly, it is an object of the present invention to provide improved means for electrically insulating the boiler and condenser of a vapor cooling system.

It is another object of the invention to eliminate the need for the use of distilled water as an electrically insulating liquid in vapor cooling systems.

Summary of the invention

Briefly described, the present invention comprises a vapor cooling system adapted to be filled to a certain level with a liquid. The system has a boiler, a condenser disposed above the boiler, a conduit communicating between the boiler and condenser, and means disposed above the level within the conduit for interrupting the flow of liquid therethrough to render such flow electrically nonconductive. The interrupting means comprise an obstruction having an upper and a lower surface defining a plurality of apertures. The lower surface of the obstruction has a plurality of projections spacially separated from the plurality of apertures from the ends of which pendant drops form and fall.

Description of the preferred embodiment

Figure 1:
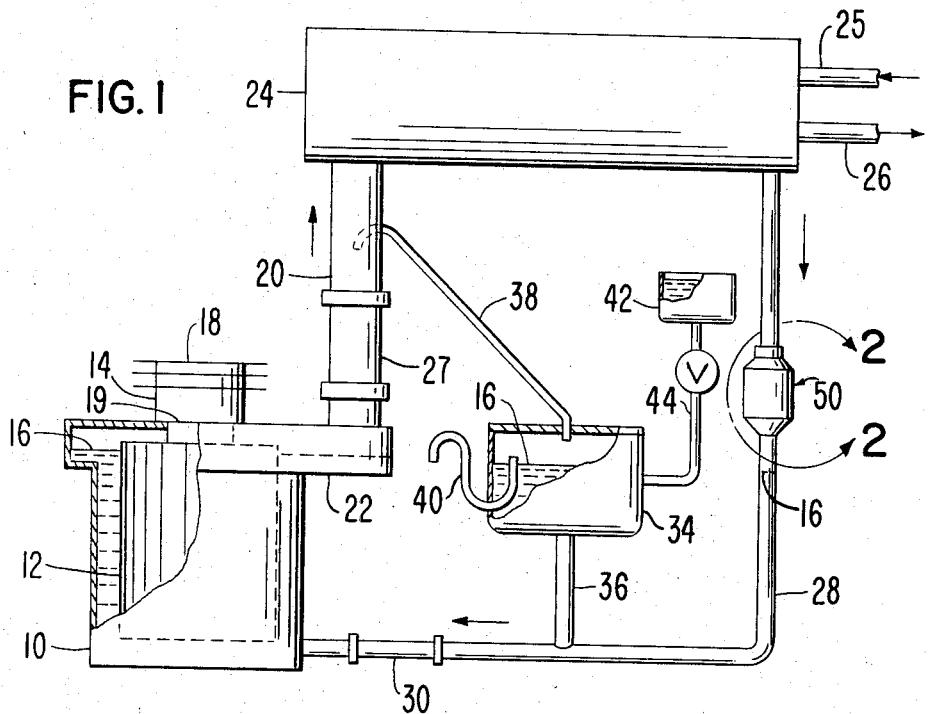
FIGURE 1 is an elevational view of a vapor cooling system in which certain components are shown broken away to reveal their interior.

Referring now in more detail to the drawing in which like components are identified by like reference numerals in the two figures, there is illustrated in FIGURE 1 a vapor cooling system having a boiler 10 which may be electrically insulated from extraneous supports by appropriate stand-off means. Sealed within the boiler is an anode 12 of an electron tube 14, and a liquid having a high latent heat of vaporization such as water. The liquid, which hereinafter is considered to be and is termed water, has a level 16 near the upper end of anode 12. Anode 12 of electron tube 14 is thus largely submersed in water within boiler 10 while socket end 18 of the tube is outside the boiler where it is available for electrical connection. Boiler 10 and electron tube 14 are physically and electrically connected at seal 19. The boiler therefore acquires a high electrical potential during tube operation.

A vapor exhaust conduit 20 links the upper portion of boiler 10 at boiler throat 22 with condenser 24 which is electrically grounded by conduit 25 of the condenser's secondary cooling system which is linked to a municipal water source. Conduit 26, which serves as a drain, may also be electrically grounded.

Vapor exhaust conduit 20 contains a dielectric member 27 which prevents any flow of electrical current from the boiler to the condenser via the vapor exhaust conduit. A water return conduit 28, having an electrically insulating member 30, links condenser 24 with the lower portion of boiler 10 thereby completing the boiler-to-condenser-to-boiler circuit.

The vapor cooling system also contains a control box 34 which serves to maintain water level 16 relatively constant within boiler 10 during system operation. Conduit 36 links the lower portion of the control box with that of boiler 10. A small pressure equilization line 38 communicates between the upper portion of control box 34 and vapor exhaust conduit 20. The control box is also provided with an overflow pipe 40 and an auxiliary water reservoir 42 which is linked to the control box by conduit 44 through valve V and which serves to replenish water that is slowly lost to the system through vented water vapor.

When power is applied to electron tube 14, anode 12 commences to heat rapidly. Water adjacent the anode vaporizes thereby dissipating some 540 calories of heat per gram of water from the anode. Vapor bubbles raise to surface 16 where they are liberated into the air. The vapor then raises through vapor exhaust conduit 20 and into condenser 24 where it transfers heat and condenses back to water. From there the condenser water returns by gravity to boiler 10 via water return conduit 28. If continuous and undistilled, the stream of water in conduit 28 provides an electrically conductive path between boiler 10 and condenser 24. A liquid flow interrupter 50 is thus incorporated into return conduit 28 above water level 16 to sever such path in accordance with principals of the present invention.

Figure 2:
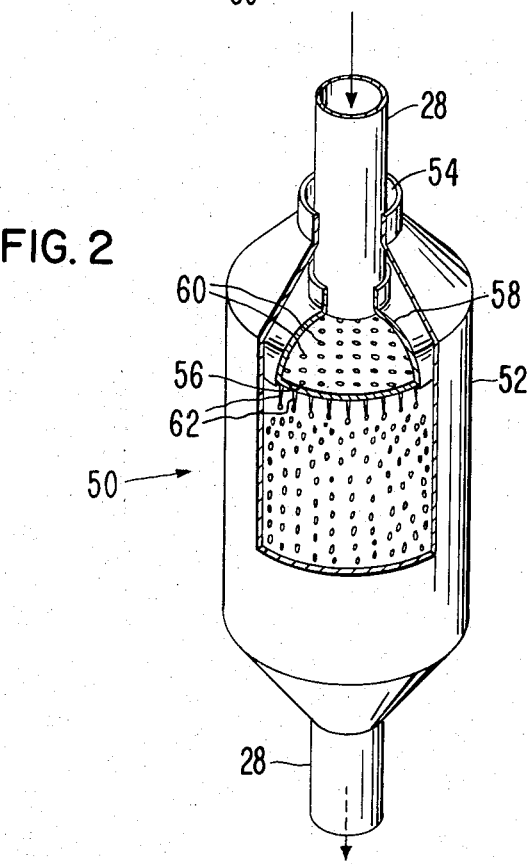
FIGURE 2 is a perspective view of one embodiment of means for interrupting the flow of a liquid in accordance with the present invention, the embodiment being shown in an operative condition.

Flow interrupter 50 is shown in greater detail in FIGURE 2 as comprising a shell 52 of cross sectional area greater than that of water return conduit 28. The shell may be made of either an electrically conductive or non-conductive material. The top and bottom of the shell are tapered inwardly and are joined to return conduit 28 which has a sectional part thereof removed within shell 52. The lower junction of the shell and return conduit is water tight; the upper junction, however, has an air gap 4 which serves as a vent. This feature deletes the necessity of attaching an independent vent at another point in conduit 28. If desired, the upper junction of shell 52 and return conduit 28 may both be made water tight in which case the return conduit is vented at some other point above water level 16.

Housed in spaced relationship within the upper portion of shell 52 is water spreader plate 56 which preferably is made of a readily wettable material. The spreader plate is disposed substantially horizontally and is held to water return conduit 28 by supporting number 58. In the illustrated embodiment supporting member 58 is conical. Such may, however, consist merely of two or more brackets in which case the periphery of spreader plate 56 may be provided with a lip. The spreader plate has a series of apertures 60. Attached to the lower side of the plate in spacial relationship with these apertures is a series of parallel spikes 62 which project downwardly.

In operation, condensed water is gravity-fed from condenser 24 down through water return conduit 28 into flow interrupter 50 and onto the upper surface of spreader plate 56 where it spreads laterally over much of the upper surface of the plate. Water on the upper surface of the spreader plate flows through the numerous apertures therein and onto the lower surface of the plate. The cumulative cross sectional area of the apertures is made to equal or exceed the cross sectional area of water return conduit 28 in order to prevent water back-up under capacity flow operative conditions in this gravity-fed system. The individual apertures directly in line with water return conduit 28 are made sufficiently small to prevent water from falling directly therethrough in columnated form. By this arrangement the cohesive force of water spreading over the surface of plate 56 and through apertures 60, together with the adhesive attraction between their respective surfaces, causes the water to flow along the bordering surfaces of the apertures and onto the lower surface of the spreader plate. At this point little if any water has fallen from the spreader plate onto the bottom of shell 52.

Once on the lower surface of spreader plate 56, water is held thereto by adhesion. As this surface is relatively wettable, there will be little if any tendency for water passing through apertures 60 to form drops along the lower periphery thereof. Instead the water will tend to cohere and form pendant drops along the lower surface of the plate. These drops will grow in size until their individual weight exceeds the adhesive force holding them to the spreader plate. This force of adhesion is proportional to the area of the surface which is available to hold the drops pendant. Consequently if their area is decreased, the weight and thus the size of the individual drops will decrease. This is the structural function of spikes 62. Water on the lower surface of spreader plate flows onto and down to the tip of these spikes. Drops which form on the tip fall before they become large since the surface area of the tips is small and thus cannot support larger drops. As a result, small intermittent drops fall from the spikes in rapid succession onto the bottom of shell 52 from which they recombine into a stream of water which flows on through the remainder of water return conduit 28 back to boiler 10.

We thus see that flow interrupter 50 functions to break the stream of water flowing therein into individual drops which are separated by an air medium. As air is electrically non-conductive, the cumulative vertical space of air in any column of falling drops serves as a dielectric voltage standoff between the bottom of the flow interrupter and the tips of the spikes. The electrical conductivity of the water thus becomes of no concern in assuring that the condenser is insulated from the boiler.

It should be understood that the above-described embodiment is merely illustrative of one application of the principals of the invention. Obviously many modifications may be made in this specific example without departing from the spirit and scope of the invention as set forth in the following claims.

What is claimed is:

1. A vapor cooling system adapted to be filled to a certain level with a liquid and having a boiler, a condenser disposed above said boiler, a conduit communicating between said boiler and said condenser, and means disposed above said level within said conduit for interrupting the flow of a liquid therethrough to render said flow electrically nonconductive, said means comprising an obstruction having an upper surface and a lower surface defining a plurality of apertures, said lower surface having a plurality of projections spacially separated from said plurality of apertures from the ends of which projections pendant drops of said liquid form and fall.

2. Claim 1 wherein said conduit has an air vent.

3. Claim 1 where said obstruction is a disk which is affixed to said conduit.

4. Claim 1 wherein said plurality of projections are parallel prongs which are affixed at one end thereof to said lower surface.

5. Claim 1 wherein said obstruction comprises a readily wettable material.

6. Claim 1 wherein said conduit has a segment of enlarged cross sectional area, and wherein said obstruction is housed within said segment.

7. Claim 6 wherein said segment has an air vent.

8. Claim 6 wherein said segment is dielectric.

9. Claim 6 wherein said obstruction is a disk.

10. Claim 6 wherein the periphery of said obstruction abuts the interior periphery of said segment.

11. Claim 6 wherein said obstruction is wider than said conduit.

12. Claim 11 wherein the area of said conduit does not exceed the area of said plurality of apertures.

References Cited

UNITED STATES PATENTS 2,873,954  2/1959  Protze _____ 165—74 X

FOREIGN PATENTS 706,209  3/1954  Great Britain.

ROBERT A. O'LEARY, *Primary Examiner.*

A. W. DAVIS, Jr., *Assistant Examiner.*